US009409138B2

(12) United States Patent
Marold

(10) Patent No.: US 9,409,138 B2
(45) Date of Patent: Aug. 9, 2016

(54) REACTOR FOR THE CATALYTIC CONVERSION OF REACTION MEDIA

(75) Inventor: Freimut Marold, Dorsten (DE)

(73) Assignee: DEG ENGINEERING GMBH, Gelsenkirchen (DE)

(*) Notice: Subject to any disclaimer, the term of this patent is extended or adjusted under 35 U.S.C. 154(b) by 165 days.

(21) Appl. No.: 14/130,369

(22) PCT Filed: Jun. 29, 2012

(86) PCT No.: PCT/EP2012/062771
§ 371 (c)(1),
(2), (4) Date: Mar. 18, 2014

(87) PCT Pub. No.: WO2013/004641
PCT Pub. Date: Jan. 10, 2013

(65) Prior Publication Data
US 2014/0248194 A1    Sep. 4, 2014

(30) Foreign Application Priority Data
Jul. 7, 2011   (DE) .......................... 20 2011 050 657

(51) Int. Cl.
*B01J 8/00* (2006.01)
*B01J 8/02* (2006.01)
*B01J 8/04* (2006.01)
(Continued)

(52) U.S. Cl.
CPC .............. *B01J 8/0496* (2013.01); *B01J 19/249* (2013.01); *B01J 2208/022* (2013.01); *B01J 2219/2453* (2013.01); *B01J 2219/2458* (2013.01); *B01J 2219/2462* (2013.01); *B01J 2219/2472* (2013.01); *B01J 2219/2479* (2013.01); *B01J 2219/2481* (2013.01); *B01J 2219/2482* (2013.01); *B01J 2219/2485* (2013.01); *B01J 2219/2495* (2013.01)

(58) Field of Classification Search
CPC .............. B01J 8/00; B01J 8/02; B01J 8/0207;
B01J 8/0242; B01J 8/04–8/0438; B01J 8/0446–8/0453; B01J 8/0461–8/0469; B01J 8/0476–8/0484; B01J 19/00; B01J 19/24; B01J 19/30–19/325; B01J 35/00; B01J 35/02; B01J 2219/24; B01J 2219/2401; B01J 2219/30; B01J 2219/302; B01J 2219/30219; B01J 2219/30276; B01J 2219/3028; B01J 2219/32–2219/32206; B01J 2219/32213; B01J 2219/32224–2219/32231; B01J 2219/32237–2219/32244; B01J 2219/32275; B01J 2219/32286; B01J 2219/32289
See application file for complete search history.

(56) References Cited

U.S. PATENT DOCUMENTS 3,528,783 A      9/1970  Haselden
4,349,450 A  *  9/1982  Hunter ................... B01J 23/40
                                              502/334
(Continued)

FOREIGN PATENT DOCUMENTS

DE    19725378 A    12/1998
DE    19754185 A    2/1999
(Continued)

*Primary Examiner* — Natasha Young
(74) *Attorney, Agent, or Firm* — Andrew Wilford

(57) ABSTRACT

A reactor has a container through which a reactive medium is passed and a plurality of plates in the container defining a plurality of between-plate reaction spaces through which the reactive medium travels. The plates are self-supporting and fixed in the container. Respective self-contained packings each formed by a support independent of the container are each of a flat shape that completely or almost completely fills the between-plate space and are each fittable to a variable depth in and removable from a respective one of the spaces. The supports each hold a catalyst for the reactive medium and are also removable from and insertable with the respective catalyst into the respective spaces such that when the catalyst is exhausted the packings can be replaced with fresh packings.

9 Claims, 3 Drawing Sheets

(51) Int. Cl.
*B01J 19/00* (2006.01)
*B01J 19/24* (2006.01)
*B01J 19/30* (2006.01)
*B01J 19/32* (2006.01)
*B01J 35/00* (2006.01)
*B01J 35/02* (2006.01)

(56) References Cited

U.S. PATENT DOCUMENTS

| | | | |
|---|---|---|---|
| 6,624,315 B2 * | 9/2003 | Zehner et al. | 549/259 |
| 7,314,603 B2 * | 1/2008 | Filippi | B01J 8/0035 422/198 |
| 7,381,851 B2 | 6/2008 | Olbert | |
| 7,691,338 B2 * | 4/2010 | Alvin | F23R 3/40 422/168 |
| 2005/0032640 A1 | 2/2005 | Huang | |
| 2008/0233043 A1 * | 9/2008 | Olbert | B01J 8/025 423/502 |

FOREIGN PATENT DOCUMENTS

| | | |
|---|---|---|
| DE | 10031347 A | 1/2001 |
| EP | 1234612 A | 8/2002 |
| EP | 2045006 A | 4/2009 |
| FR | 2934174 A | 1/2010 |

* cited by examiner

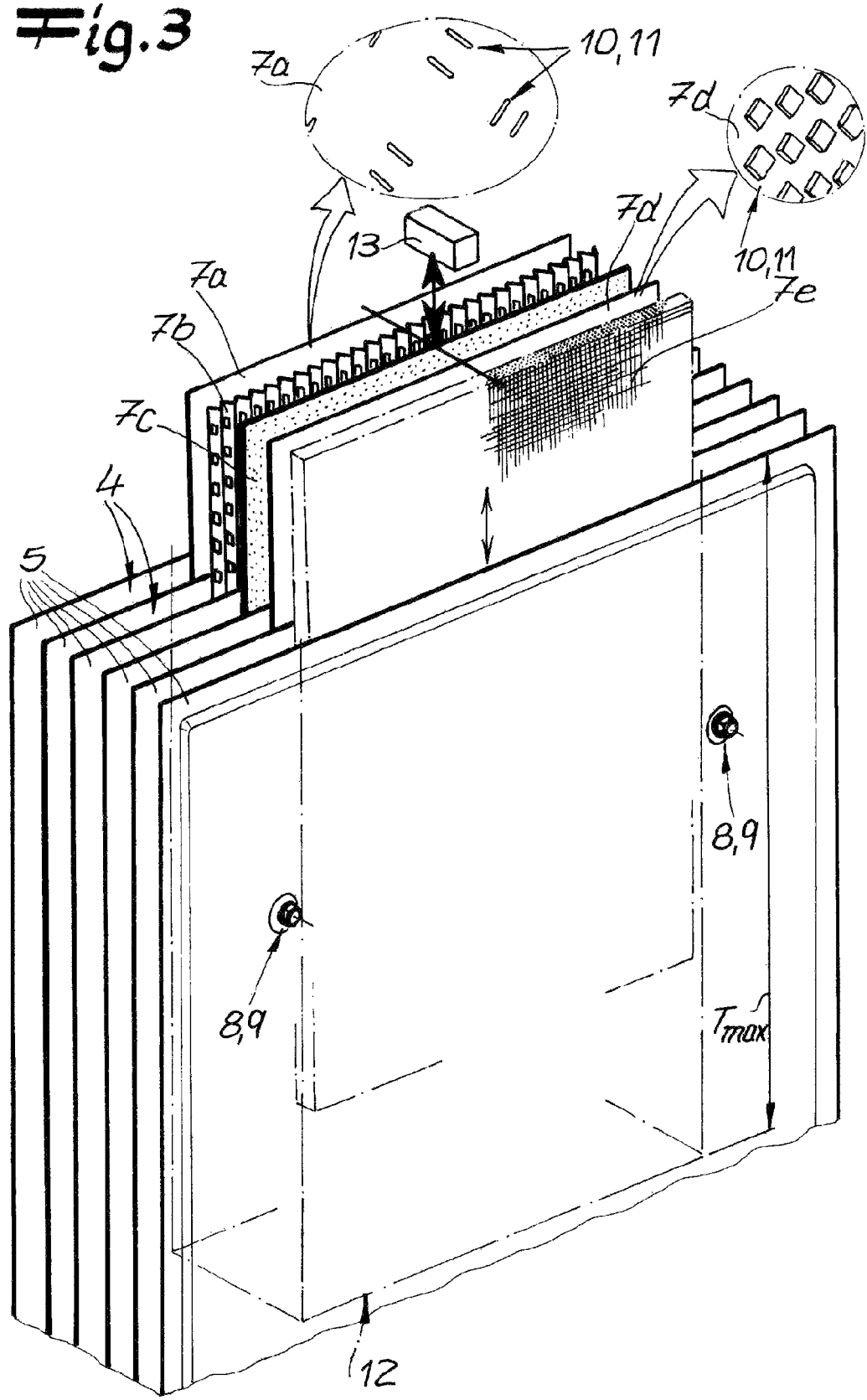

REACTOR FOR THE CATALYTIC CONVERSION OF REACTION MEDIA

CROSS REFERENCE TO RELATED APPLICATIONS

This application is the US-national stage of PCT application PCT/EP2012/062771, now WO 2013/004641, filed 29 Jun. 2012 and claiming the priority of German patent application 20 2011 050 657.6 itself filed 7 Jul. 2011.

FIELD OF THE INVENTION

The invention relates to a reactor for the catalytic conversion of a reactive medium in a reaction space by a catalyst comprising a plate heat exchanger in a reactor container, the plate heat exchanger being essentially formed by heat-exchanger plates separated by packings, the plates defining between them the reaction space through which the reactive medium flows.

BACKGROUND OF THE INVENTION

These reactors are used both for exothermic as well as endothermic reactions. In the first case, the plate heat exchanger functions to remove heat from the reactor container. In the second case, the plate heat exchanger is used to supply heat. The catalysts used are generally in the form of pourable catalyst particles that are held in the space or spaces between the individual heat-exchanger plates of the plate heat exchanger. This not only creates one or more reaction spaces but in fact heat transfer spaces are also defined by the heat-exchanger plates and the heat transfer medium is conducted through these spaces.

Reactors of this type are generally well-known and have proven successful, and reference is made in this regard to DE 1 97 54 1 85. The specific catalyst through which the reactive medium flows is in the space(s) between the adjacent heat-exchanger plates and creates a fixed bed. The heat-exchanger plates are thermal plates through which a cooling medium flows. They are formed by at least two sheet-steel plates joined at predetermined points so as to create flow channels. The plate heat exchanger is installed on a perforated base whose mesh size is designed to be smaller than the particle size of the catalyst particles.

Whenever the catalyst or catalyst particles in these reactors are exhausted, they need to be replaced. This is also true whenever the catalyst particles have been poisoned or otherwise consumed. This typically necessitates a procedure whereby the reactor must be completely or partially dismantled.

For this reason EP 1 234 612 has provided an alternative where a thin layer of the catalyst is applied to at least one part of the overall surface of the heat-exchanger plates or thermal plates. This primarily prevents the individual catalyst particles from being able adhere during the time the reactor is used as intended since they can only be removed from the reactor with considerable effort. This procedure furthermore prevents catalyst grains or catalyst particles from getting wedged in the individual thermal plates. In extreme cases, this can even result in the creation of recesses in which no catalyst particles are present. This is of course unacceptable for the uniform, nonhazardous, and efficient operation of the process during conversion of the reactive medium.

The desired goal in any case for the procedure disclosed in EP 1 234 612 is to be able to increase the overall useful cooling or heating surface area per reaction space volume, the values indicated in this case for the lower limit being 150 $m^2/m^3$. The above-described problems when the catalyst is used, its possible poisoning and in particular regarding replacement of the catalyst have not been solved by these actions.

The same applies with the generic reactor set forth in EP 2 045 006 A1. The reactor here is provided with flat extended spacers that are heat-exchanger plates between two thermal plates. The goal of the spacers is to enable improved cleaning of the heat-exchanger plates. Another intended purpose of the spacers is to enhance strength. This is relevant, in particular, whenever the operation uses individual thermal plates consisting of plate packets. The approach of the known teaching also uses an extensive spacer designed as a closed box whose interior is equipped with devices to record reaction parameters. These may involve, for example, sensors or also nozzles for performing the cleaning function. Also described is a design for the extensive spacers in the form of catalyst cages. What remains unchanged, however, is the fact that the actual spacers are between the two thermal plates or join them to each other. Any replacement of the catalyst thus turns out to be just as difficult as before.

A reactor that has heat-exchanger plates is described in DE 100 31 347 that functions in the conventional manner with a catalyst packing between individual heat-exchanger plates. Special emptying devices are provided here to allow catalyst to be discharged as required.

Finally, U.S. Pat. No. 3,528,783 should also be referenced that relates to a catalyst reactor using a sandwich design. Here a heat exchanger plate is typically coated with the catalyst material, after which another heat exchanger plate is mounted. Problems of catalyst replacement do not come into play here. This is where the invention intends to provide a complete solution.

OBJECT OF THE INVENTION

The object of the invention is therefore to further develop a reactor of this type for the catalytic conversion of reactive media within a reaction space using a catalyst so as to allow easy replacement of the catalyst and achieve greater cost-effectiveness relative to the prior art.

SUMMARY OF THE INVENTION

In order to achieve this object, a generic reactor as set forth in the invention is characterized in that the specific packing is implemented in the form of a support that is constructed to be independent from the plate heat exchanger and that thus can be selectively inserted into and removed from the between-plate space defining the reaction space.

According to the invention, a packing is first of all employed that is constructed to be independent from the plate heat exchanger. This means that the plate heat exchanger as such does not require the packing, nor is the packing or does the packing have to be a constituent component of the plate heat exchanger in order to use the packing. This design is in contrast to the embodiment of EP 2 045 006 in which catalyst cages referenced therein (see [0066]) are necessarily provided in the form of spacers and create (or must create) a permanent attachment to the respective heat-exchanger plates.

In contrast, the packings according to the invention do not perform a joining function, spacing function, nor any other type of function in creating the plate heat exchanger from the individual heat-exchanger plates. This means that the plate heat exchanger is constructed to be independent of the one or more packings, and can be constructed independently of the packings.

Unlike the plate heat exchanger or the individual heat-exchanger plates, the packings thus function as inserts or long-reach inserts that either completely or partially fill, or do not fill, the between-plate space. This immediately enables any consumed or also poisoned catalysts to be easily exchanged or replaced. In addition, the reactor according to the invention can be selectively operated either with or without the catalyst. That means that the individual processes—the catalytic conversion of the reactive medium on the one hand and the function of the heat exchanger—are separated from each other both functionally and in terms of construction.

Another completely different aspect is the fact that the reactor according to the invention achieves its maximum strength completely independently of the packings, the number of packings, and also their design. In an advantageous embodiment, the packing can be disposed and positioned at an adjustable penetration depth within the between-plate space. This has a predetermined penetration depth or insertion depth in the given between-plate space.

This penetration depth or insertion depth can, for example, be half or three quarters of the maximum possible insertion depth or penetration depth within the between-plate space. This allows the actual required volume of the catalyst to be adjusted as required within a wide range. According to the invention, only that number of catalysts or catalyst particles are thus introduced into the between-plate space that are actually required for the subsequent catalytic conversion of the reactive medium. This reduces not only the cost in terms of energy but also the amount of waste when disposing of the catalyst.

In addition, this allows the contact surface area or heat exchange surface area to be minimized between the catalyst or the packing supporting the catalyst, and the single-sided or double-sided heat-exchanger plates. As a result, the size of the heating surface area or cooling surface area can be adjusted. This furthermore improves the removal or addition of heat. This is because heat transfer takes place directly where it is generated.

Possible reactive media include both gases and liquids, as well as mixed phases like gas/liquid, gas/solid, or in principle also solids. The specific reactive medium may interact with the catalyst by chemisorption, absorption, adsorption, etc. Possible catalytic conversion fundamentally includes oxidation processes as well as reduction processes. This can just as well relate to physical-thermal conversions.

One example is provided by the production of ethylene oxide from ethylene and oxygen in the gaseous phase, as has already been described in connection with EP 1 234 612. Furthermore, hydrocarbons can be oxidized, in particular, alkanes and alkenes. The reactor may furthermore be used to produce acrylic acid, propylene oxide, etc., as described in detail in DE 100 31 347. Another area of application that should be highlighted in particular is catalytically removing nitrogen oxides from exhaust gases and breaking them down into nitrogen and water. This exhaust gas treatment can be employed especially advantageously in diesel engines, and, in particular, stationary diesel engines.

Designing the packings as supports for the catalyst whose construction is independent of the plate heat exchanger enables individual plate heat exchangers to be provided in the form of plate heat exchanger modules that can be joined in an overall modular fashion to create one reactor. The treatment of liquid reactive media can be further facilitated by the fact that precise channels can be defined by the specific packing within the reaction space. This means that the packing is employed in this case to provide or to define special reaction channels for the liquid or also gaseous reactive medium flowing through it. One approach that has furthermore proven successful in this regard is to provide the packing with guides for the reactive medium. These guides can allow the (liquid) reactive medium to be conducted and optionally set into a turbulent swirl motion within the reaction space. The same of course also applies whenever the operation involves a gaseous reactive medium.

One or more spacers are typically provided in order to set the between-plate space between the individual adjacent heat-exchanger plates in terms of thickness, length, and width. These spacers enable adjacent heat-exchanger plates to be joined to each other. This allows both mobile as well as semi-mobile reactors to be provided; the reactor can thus be constructed accordingly and operated as required.

An approach has proven successful where each packing is formed as a flat panel. The packing here generally has a surface area that fills the between-plate space completely or almost completely. In the event the packing is inserted into the between-plate space at a penetration depth that is adjustable relative to the maximum penetration depth, it is of course obvious that only such a surface area will be employed that is matched appropriately.

The invention furthermore recommends that each packing be provided with a thickness that is the same as the between-plate space. This material thickness first of all takes into account the ability to easily remove the packing from and insert it into the respective between-plate space; in other words, there is thus no observable tilting or wedging or other type of mechanical impairment during this procedure. On the other hand, the material thickness of the packing must also not be of excessively small dimension so as to ensure that the requisite transfer of heat occurs or can occur between the catalyst particles, or in general between the catalyst supported by the packing and the adjacent walls or heat-exchanger plates.

A number of different variants have proven especially advantageous in this regard. Each packing can be coated, for example, with the catalyst. The procedure used here may be analogous to the one described in above-cited EP 1 234 612 with respect to the heat-exchanger plates coated with the catalyst. In other words, instead of the heat-exchanger plates, each packing according to the invention is coated in analogous fashion with the catalyst. The packing may generally involve a metal sheet that is provided with the catalyst coating. This coating can be formed, for example, by powder deposition operation such as chemical vapor deposition (CVD). In principle, physical vapor deposition (PVD) is also possible. Also conceivable and included here are sputtering methods or also galvanometric methods.

In one variant, it is alternatively or additionally also possible for each packing to be provided with recesses that are coated with the catalyst and open toward the outside. These recesses, including the catalysts therein, that are open toward the outside or toward the reaction space ensure that the specific catalyst material can come into contact with the reactive medium that is passed through the reaction space. Examples of these packings can be perforated plates or meshes. They may also include corrugated plates or guide plates whose corrugations or depressions are provided with the desired catalyst material.

In an especially advantageous embodiment, the packing is a mesh or net envelope surrounding the catalyst. The mesh size of the packing that is used here is typically designed to be smaller than the particle diameter of the catalyst particles that are usually accommodated herein. An embodiment of this type can be produced very easily and filled with the catalyst particles. Specifically, the net or mesh packing typically has an opening, like a tube or a bag, through which the catalyst particles can be introduced. The net or mesh structure of the packing ensures that the catalyst particles cannot escape to the outside. At the same time, this structure ensures that the catalyst material can interact with the reactive medium. The net or mesh packing can be a metal mesh or wire mesh that is formed as a panel.

The heat-exchanger plates can be provided in the form of thermal plates such as those described above in detail with reference to DE 197 54 1 85. As an alternative or supplement to the thermal plates, it is also possible to use web plates, tube-on-tube arrangements, embossed plates, etc. to create the heat-exchanger plates. As was already explained above, the individual heat-exchanger plates are advantageously joined to each other by spacers so as to define the between-plate space to receive the packing. An approach has proven successful here where the spacers delimit a pocket in the respective between-plate space, into which pocket the packing is or can be inserted. In principle, it is also possible for one or more spacers to pass through the packing.

The packing is usually made of metal, as explained above. This metal advantageously is one that does not react with the reactive medium and also possesses the requisite thermal stability. The metal or the material forming the packing responds neutrally to the reactive medium, with the result that this medium reacts only with the catalyst or the catalyst particles, and can react only therewith.

BRIEF DESCRIPTION OF THE DRAWING

The following describes the invention in more detail with reference to a drawing that shows only one embodiment. Therein:

FIG. 3 shows different variants of the packing that is used according to the invention.

DETAILED DESCRIPTION OF THE INVENTION

Figure 1:
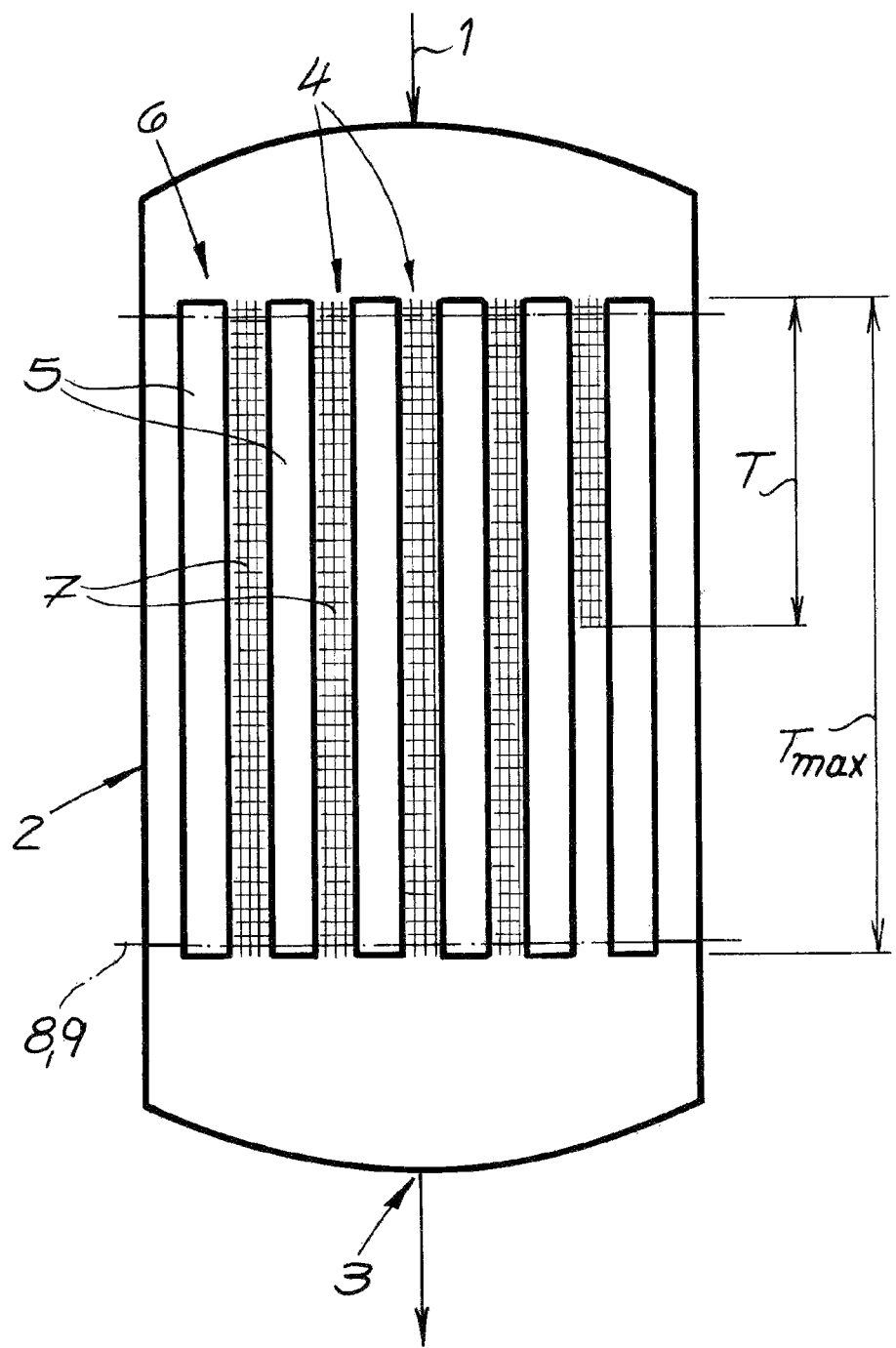
FIG. 1 is a schematic overall view of the reactor.

FIG. 1 shows a reactor for the catalytic conversion of reactive media 1. The reactive medium 1 in fact enters at the top into a reactor comprising a cylindrical housing or reaction container 2, and exits the reactor or its housing 2 through a discharge or outlet 3 at the base of the reactor. In principle, the path of the reactive medium 1 can of course be reversed.

The reactive medium 1 passes through multiple reaction spaces 4 inside the reactor or its housing 2, each of the spaces being between two heat-exchanger plates 5. The heat-exchanger plates 5 in this embodiment are thermal plates 5. Instead of the thermal plates 5, it is also possible to employ web plates, that is, plates that are separated by web-like links in contact with the heat exchanger medium in the between-plate space. Similarly conceivable are heat-exchanger plates 5 in the form of tube-on-tube arrangements, embossed plates with throughgoing holes, etc. The thermal plates 5 can obviously also be combined with, for example, a web plate or embossed plate. This is not illustrated in detail, however.

Figure 2:
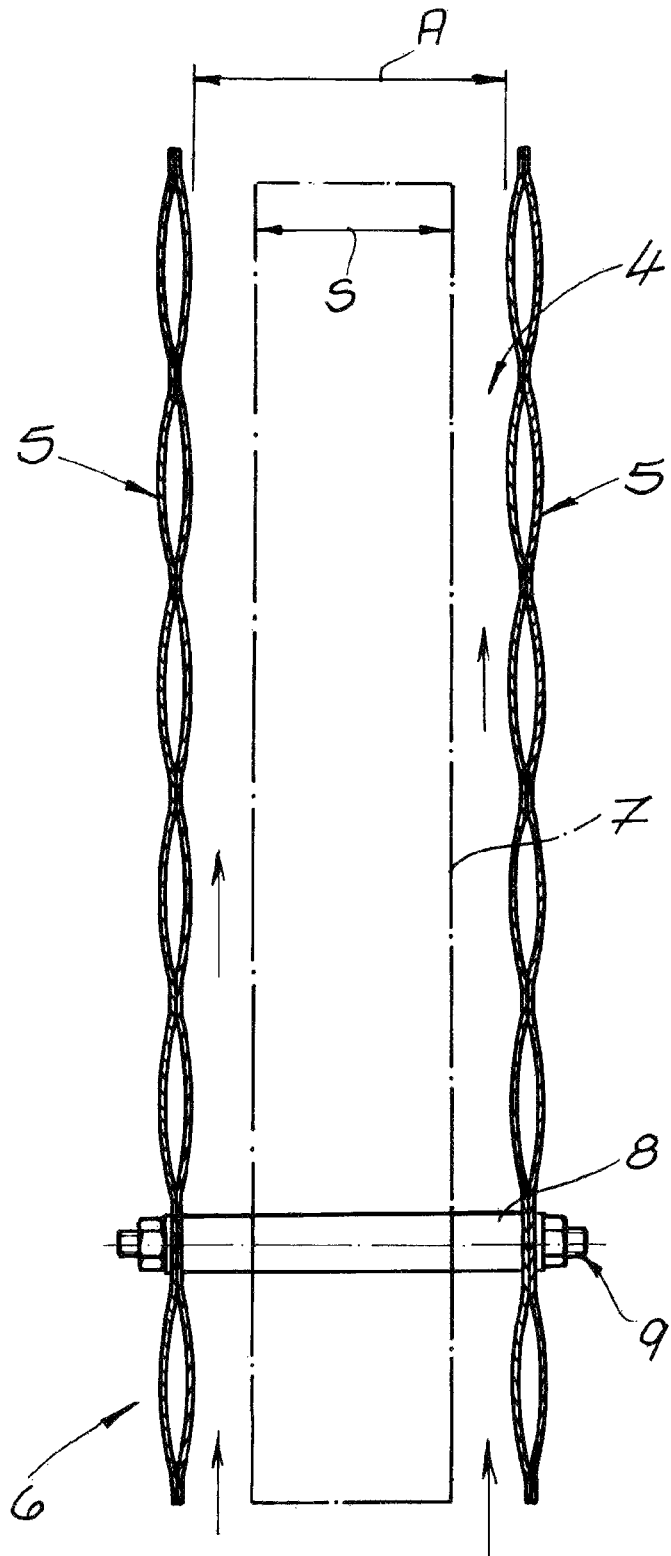
FIG. 2 is a detail of a section through FIG. 1.

The thermal plates 5 are constructed in such a way that two plates are joined to each other by spot welds and/or roller welds. The thermal plates 5 here are typically plastically molded under hydraulic pressure to form a pillow-like configuration, as illustrated in the sectional view and detail of FIG. 2. The pillow-like configuration enables pillow-like channels to be automatically created to allow passage of the heat exchanger medium through the heat-exchanger plates or the thermal plates 5. This is shown in FIG. 2.

A complete plate heat exchanger 6 is created inside the reactor or associated housing 2, the heat exchanger being formed by the individual and mutually spaced the heat-exchanger plates 5. The heat-exchanger plates 5 respectively define between them one or more reaction spaces 4 through which the reactive medium 1 flows. What is in fact created between adjacent the heat-exchanger plates 5 is between-plate reaction spaces 4. Individual heat-exchanger plates 5 are separated from each other by packings 7. These packings 7 either completely or partially fill the respective between-plate spaces 4.

A total of five different packings 7a, 7b, 7c, 7d, and 7e are shown in the embodiment of FIG. 3. This number is obviously not intended to be comprehensive. Each packing 7 forms for the catalyst a support 7 whose construction is independent of the plate heat exchanger 6. As a result, a support or packing 7 can be selectively inserted into each of the between-plate spaces 4 or removed from the between-plate spaces 4.

This independent design furthermore enables the packing 7 to be inserted at an adjustable penetration depth T into the between-plate spaces 4. This adjustable penetration depth T can at most correspond to the maximum penetration depth $T_{max}$ or approach this maximum penetration depth $T_{max}$. Depending on the design and configuration of the packing 7, it thus completely or partially fills the respective between-plate space 4, allowing for adjustable penetration depth T. In order to vary penetration depth T, the packing 7 is acted upon by an adjustment device 13. The adjustment device 13 acts on individual packings or all packings 7 so that they attain the desired penetration depth T. This is indicated by a double arrow in FIG. 3.

One or more spacers 8, 9 can be provided to define the between-plate space 4. Each spacer 8, 9 in the embodiment is formed by one or more spacer bushings 8 and a fastener 9. It is also possible in principle as required to employ only one spacer bushing 8. The spacer bushing 8 determines the gap or size of the between-plate space 4 between the heat-exchanger plates 5. This between-plate space 4 is filled either completely or partially with the packing 7 (see FIG. 2).

The packing 7 can for this purpose be designed in flat sheet form, and completely or almost completely fill the respective between-plate space 4. The surface area of the packing 7 is designed accordingly. In addition, the packing 7 as indicated in the sectional view of FIG. 2 is of a material thickness S that is complementary to a spacing A between adjacent heat-exchanger plates 5, and is consequently complementary to the widths of the between-plate spaces 4.

Each packing 7 can be coated with a catalyst, as is illustrated by packing variant 7c of FIG. 3. In addition, each packing 7 can also be provided with recesses 10 that are coated with the catalyst and that open outward. The recesses 10 of this type are located in a corrugated plate 7a indicated in the variant view of FIG. 3, and also in the guide plate 7d of the same FIG. 3. In both cases the packing 7 is provided in addition to the recesses 10 with guides 11 that make the reactive medium 1 undergo a specific movement and/or turbulent swirl motion.

In another variant, the packing 7 surrounds the catalyst with a net or mesh. This is shown in alternative 7e of FIG. 3. It is evident here that the wire mesh is provided in the form of a mesh envelope that internally holds the catalyst particles. The mesh or mesh envelope has a mesh size that is smaller than the diameter of the catalyst particles. This prevents the catalyst particles enclosed by the packing or mesh 7 from passing out through this mesh.

The individual spacers 8, 9 together can define a pocket 12 within between-plate space 4. The packing 7 can be inserted in this pocket 12. This is shown clearly in FIG. 3. The spacers 8, 9 can also pass through the packing 7. The entire packing 7 is made of a metal that does not react with the reactive medium 1. Other materials can obviously also be employed. Also within the scope of the invention is the case where the packing 7 intentionally reacts with the reactive medium 1, for example, as a (supplementary) catalyst. The packing 7 in this case is then "consumed" after a certain period of time and must be replaced. If a mesh or mesh panel is used as the packing 7 it is made of metal.

The invention claimed is:

1. A reactor comprising:
a container through which a reactive medium is passed;
a plurality of thermal plates in the container each formed by a pair of spaced but joined together metal sheets;
spacer bushings braced between the thermal plates;
respective fasteners extending through each of the spacer bushings and the respective thermal plates to define between the respective thermal plates respective between-plate reaction spaces through which the reactive medium travels, the thermal plates being self-supporting and fixed in the container; and
respective self-contained packings each formed by a support independent of the thermal plates and of the container and a catalyst for the reactive medium carried on the support, each support being flat and completely or almost completely filling the respective between-plate space, each packing being fittable to a variable depth in and removable from a respective one of the spaces, the supports being removable from and insertable with the respective catalyst into the respective spaces such that when the catalyst is exhausted the packings can be replaced with fresh packings.

2. The reactor according to claim 1, wherein each packing is of a material thickness that is generally equal to a spacing between the respective thermal plates such that each packing is complementary to the respective between-plate space.

3. The reactor according to claim 1, wherein each packing is coated with the catalyst.

4. The reactor according to claim 1, wherein each packing is provided with recesses that are coated with the catalyst and outwardly open.

5. The reactor according to claim 1, wherein each packing is a mesh surrounding the catalyst.

6. The reactor according to claim 5, wherein a maximum mesh size of each packing is smaller than a particle diameter of the catalyst particles.

7. The reactor according to claim 1, wherein each packing is provided with guides for the reactive medium.

8. The reactor according to claim 1, wherein the supports are each of a metal.

9. The reactor according to claim 8, wherein the metal does not react with the reactive medium.

* * * * *